Patented June 12, 1951

2,556,488

UNITED STATES PATENT OFFICE 2,556,488

MANUFACTURE OF POLYSTYRENE

Leslie Ernest Wakeford and Donald Helmsley Hewitt, London, England; Ernest Booth and Richard Hartlebury Buckle, executors of said Donald Helmsley Hewitt, deceased, assignors, by mesne assignments, to The Sherwin-Williams Company, Cleveland, Ohio, a corporation of Ohio No Drawing. Application October 22, 1945, Serial No. 623,887. In Great Britain November 3, 1944

17 Claims. (Cl. 260—29.8)

This invention relates to the manufacture of polystyrene and has particular reference to the production of styrene polymers of low molecular weight from monomeric styrene.

It is known that the polymerisation of monomeric styrene by heating it in various solvents produces polystyrenes of different molecular weights dependent upon the particular solvent employed, and that with equal concentrations of styrene, not only do different solvents lead to the production of polystyrenes of different molecular weights, but the respective rates of polymerisation of the styrene vary in accordance with the nature of the solvent employed.

Further the production of polystyrenes of relatively low molecular weight by heating monomeric styrene in solvents that are useful for the production of paints, varnishes, lacquers and the like has hitherto been accomplished most successfully by polymerising the monomeric styrene in the presence of catalysts, particularly those, such as benzoyl peroxide, which are soluble in the polymer and its solutions, or others, such as fuller's earth or activated clay, which are insoluble therein. Catalysts of the kind just mentioned are disadvantageous because the insoluble ones require removal by filtration after the polymerisation has been effected, or, if, like benzoyl peroxide, they remain in the final product the value of the latter is impaired for many purposes.

The present invention has for its objects to overcome the disadvantages above mentioned in the production of polystyrenes of low molecular weight and to simplify the manufacture of these products whilst at the same time enabling a more effective control to be exercised over the molecular weight of the polystyrene finally obtained. For this purpose according to the present invention polystyrene of a relatively low molecular weight is obtained by effecting the polymerisation of monomeric styrene in a solvent or mixture of solvents consisting of or comprising one or more alpha terpenes of the monocyclic or dicyclic type. Thus the solvent in which the polymerisation of the monomeric styrene is carried out may consist of one or more terpenes alone of the kind just mentioned, or may comprise an admixture of one or more of the said terpenes with another solvent, such as an aromatic hydrocarbon, for instance xylene, and/or an aliphatic hydrocarbon, for instance mineral spirits. Dipentene and alpha pinene may be mentioned as examples respectively of the monocyclic and dicyclic alpha terpenes for use in connection with the present process.

We have found that the employment of solvents consisting of or comprising monocyclic or dicyclic alpha terpenes has a marked effect on the polymerisation of monomeric styrene and enables polymers of low molecular weight to be obtained without the disadvantages previously referred to.

Whilst it will be appreciated that the actual molecular weight of the polystyrene produced by the improved process according to the present invention is dependent upon the relative proportions of the styrene and terpene solvent, the nature of the latter and the conditions under which the polymerisation reaction is carried out, the use of solvents consisting of or comprising monocyclic or dicyclic alpha terpenes results in all cases in the production of a polystyrene of a relatively low molecular weight, for example of the order of about 9,000 to 12,000, as compared with polystyrenes having a considerably higher molecular weight, for example of the order of about 50,000 to 70,000, produced by polymerisation of the styrene in an equal concentration of xylene.

Furthermore, in the case where the polystyrene is to be employed in the manufacture of film forming compositions, such as varnishes, lacquers and paints, the presence of a monocyclic or dicyclic alpha terpene solvent is particularly beneficial, as various solvents of this nature (such as turpentine and dipentene) are already extensively used in paint and varnish manufacture, and are known to confer on films good brushing and drying properties, whilst at the same time possessing good wetting and dispersing properties. In this connection it may be remarked that, in the process described in the specification of our copending application Serial No. 496,780, filed July 30, 1943, now U. S. Patent No. 2,392,710, for the production of interpolymers of aromatic vinyl hydrocarbons with polyhydric alcoholic mixed esters containing substantial proportions of unsaturated fatty acid radicles, mineral spirits and turpentine are mentioned amongst the various solvents instanced as being suitable for effecting the polymerisation treatment of the mixture of aromatic vinyl hydrocarbon (such as styrene) and partially polymerised polyhydric alcoholic mixed esters (such as linseed stand oil, dehydrated castor oil etc.), and in certain cases it was stated that use of these solvents might yield homogeneous solutions of reaction products of particular value in the manufacture of paints and varnishes. It is to be understood therefore that the present invention does not include within its scope the manufacture of interpolymers of styrene with polyhydric alcoholic mixed esters by any of the processes, particularly that mentioned above involving the use of turpentine as a solvent, described in the aforementioned U. S. Patent No. 2,392,710, of which this application is a continuation-in-part.

In illustration of the results obtained by the process according to the present invention, the following experiment shows the comparative effects of commercial dipentene, xylene and mineral spirits on the polymerisation of styrene. Mixtures of styrene and commercial dipentene (which latter actually contains fairly large amounts of alpha terpinene and alpha terpinolene in addition to dipentene) in various proportions were made up. Samples were poured into test tubes previously drawn out at the top, so that they could be sealed in the blow pipe flame. The sealed tubes were then immersed in a heated oil bath, the temperature of which was electrostatically controlled, along with sealed tubes containing samples of styrene and xylene, or styrene and mineral spirits of equal styrene concentrations. For the samples with high concentrations of styrene the temperature was then raised gradually over a long period of time, whilst for the mixtures with low concentrations of styrene (about 25 per cent by weight) the temperature was held at 140° C. for about 30 hours. After heating the tubes for a given time, they were taken out, broken, and a weighed amount of the mixture poured into excess of petroleum ether. The ether was poured off the precipitated polymer, which was washed with fresh ether and dried under vacuum up to 200° C. The polymers were then dissolved in pure benzene so as to give a 1 per cent solution and the time taken to flow through a No. 1 Ostwald viscometer determined at 20° C. In the case of the samples prepared from styrene and dipentene in which the proportion of styrene was considerably less than that of the dipentene, the low molecular weight polymer produced after heating the mixture appeared to be partly soluble in petroleum ether, so in place of the latter alcohol was substituted for the precipitating medium; it was found that the polymer came down very well, especially if the alcohol was warmed slightly after adding the solution thereto.

The following table illustrates the effect of the different solvents upon the polymerisation of styrene, the reaction being carried out in the manner described in the aforementioned experiment:

*Table 1*

| Percentage of Styrene (by weight) | Percentage of Solvent Employed (by weight) | Temperature to which heated °C. | Time of heating in hours | Percentage of Polymerisation | Viscosity of solution in benzene of the polystyrene Seconds |
|---|---|---|---|---|---|
| 90 | 10% Xylene | 80–180 | 15½ | 94 | 425 |
| 90 | 10% Dipentene | 80–180 | 15½ | 90 | 235 |
| 80 | 20% Xylene | 75–150 | 27 | 80 | 500 |
| 80 | 20% Dipentene | 75–150 | 27 | 60 | 240 |
| 25 | 75% Mineral Spirits | 140 | 30 | 68 | 28 |
| 25 | 75% Dipentene | 140 | 30 | 35 | 18 |

In the above table the viscosity of the polymers obtained in the first four experiments by heating in the respective solutions is expressed as the time, in seconds, taken for a 1 per cent solution of the polymer in benzene to flow through a No. 1 Ostwald viscometer, whilst the viscosity of the polymers obtained in the last two experiments is expressed as the time, in seconds, taken for a 2 per cent solution of the polymer in benzene to flow through a No. 2 Ostwald viscometer, all the viscosities being measured at 20° C.

The time of flow in seconds through the viscometer has not been interpreted in actual terms of molecular weights, but the values of the respective viscosities in column 6 of Table 1, however, are sufficient to show that the molecular weights of the polystyrene obtained in the presence of dipentene are very much less than those obtained in xylene or mineral spirits.

It may be noted that in the case of the experiment with mineral spirits (line 5 of Table 1) the polymer was soluble in the hot solution but came out of solution on cooling, whilst when using xylene and dipentene as solvents the polymer was soluble both in the hot and cold. From the results given in the above table it will be noted that in addition to the lower molecular weight of the polymers formed in dipentene, the terpene solvent reduced the rate of polymerisation of the styrene.

In Table 2 there are shown the results of another series of comparative experiments carried out on lines similar to those previously described (the results of which were given in Table 1), but in which the terpene solvent employed was alpha pinene instead of dipentene. The sample of alpha pinene was substantially pure, such as is normally used in the manufacture of camphor.

*Table 2*

| Percentage of Styrene (by weight) | Percentage of Solvent Employed (by weight) | Temperature to which heated °C. | Time of heating in hours | Percentage of Polymerisation | Viscosity of solution in benzene of the polystyrene Seconds |
|---|---|---|---|---|---|
| 50 | 50% Xylene | 100–180 | 20 | 64 | 370 |
| 50 | 50% Alpha Pinene | 100–180 | 20 | 92 | 230 |
| 25 | 75% Mineral Spirits | 140 | 30 | 68 | 28 |
| 25 | 75% Alpha Pinene | 140 | 30 | 76 | 17.5 |

In the above Table 2 the viscosity of the polymers obtained in the first two experiments, where the percentage of styrene initially mixed with the solvent amounted to 50 per cent, is expressed as the time in seconds taken for a 1 per cent solution of the polymer in benzene to flow through a No. 1 Ostwald viscometer, whilst the viscosity of the polymers obtained in the last two experiments where the initial concentration of the styrene amounted to 25 per cent is expressed as the time in seconds taken for a 2 per cent solution of the polymer in benzene to flow through a No. 2 Ostwald viscometer, all the viscosities being measured at 20° C.

From the details given in Table 2 it will be seen that the viscosity of the polystyrene produced in the presence of alpha pinene is considerably lower than the viscosity of the polymers formed in xylene or mineral spirits; from these viscosity figures it is apparent therefore that alpha pinene exerts an effect similar to that of dipentene in producing polystyrenes of relatively low molecular weight. Further from the figures of percentage of polymerisation given in Table 2, it will be noted that alpha pinene appears to give a somewhat faster rate of reaction than xylene or mineral spirits for the production of the polystyrene.

In a third series of comparative experiments, a sample of commercial dipentene was fractionally distilled to yield pure dipentene, alpha terpinene and alpha terpinolene and each of these products was separately tested in mixture with styrene in experiments similar to those previously described in connection with Table 1 and found to give polystyrenes of low molecular weight, as shown by the results given in Table 3 below:

Table 3

| Percentage of Styrene (by weight) | Percentage of Solvent Employed (by weight) | Temperature to which heated | Time of heating in hours | Percentage of Polymerisation | Viscosity of solution in benzene of the polystyrene |
|---|---|---|---|---|---|
| | | °C. | | | Seconds |
| 50 | 50% Xylene | 100–180 | 25 | 78 | 365 |
| 50 | 50% Limonene | 100–180 | 25 | 63 | 220 |
| 50 | 50% Alpha Terpinene | 100–180 | 25 | 31 | 220 |
| 50 | 50% Alpha Terpinolene | 100–180 | 25 | 26 | 230 |

In the above Table 3 the viscosity of the polymers obtained by heating in the respective solutions is expressed as the time, in seconds, taken for a 1 per cent solution of the polymer in benzene to flow through a No. 1 Ostwald viscometer, all the viscosities being measured at 20° C.

What we claim and desire to secure by Letters Patent of the United States is:

1. A process for the production of polystyrene of a relatively low molecular weight in the order of 9,000 to 12,000 which consists in effecting the polymerization by heating, in the absence of a polymerization catalyst, monomeric styrene in a solvent containing at least one terpene of the class consisting of monocyclic and dicyclic alpha terpenes in an amount sufficient to control the molecular weight of the product.

2. A process as claimed in claim 1 wherein the terpene consists of dipentene.

3. A process as claimed in claim 1 wherein the terpene consists of alpha pinene.

4. A process as claimed in claim 1 wherein the terpene consists of limonene.

5. A process as claimed in claim 1 wherein the terpene consists of alpha terpinene.

6. A process as claimed in claim 1 wherein the terpene consists of alpha terpinolene.

7. A process as claimed in claim 1 in which the polymerization of the styrene is effected in a solvent containing an admixture of a monocyclic alpha terpene and an aromatic hydrocarbon.

8. A process as claimed in claim 1 in which the polymerization of the styrene is effected in a solvent containing an admixture of a monocyclic alpha terpene and an aliphatic hydrocarbon.

9. A process as claimed in claim 1 in which the polymerization of the styrene is effected in a solvent containing an admixture of a monocyclic alpha terpene and xylene.

10. A process as claimed in claim 1 in which the polymerization of the styrene is effected in a solvent containing an admixture of a monocyclic alpha terpene and mineral spirits.

11. A process as claimed in claim 1 in which the polymerization of the styrene is effected in a solvent containing an admixture of a dicyclic alpha terpene and an aromatic hydrocarbon.

12. A process as claimed in claim 1 in which the polymerization of the styrene is effected in a solvent containing an admixture of a dicyclic alpha terpene and an aliphatic hydrocarbon.

13. A process as claimed in claim 1 in which the polymerization of the styrene is effected in a solvent containing an admixture of a dicyclic alpha terpene and xylene.

14. A process as claimed in claim 1 in which the polymerization of the styrene is effected in a solvent containing an admixture of a dicyclic alpha terpene and mineral spirits.

15. A process as claimed in claim 1 in which the quantity of solvent employed is equal to the quantity of styrene subjected to the polymerization reaction.

16. A process as claimed in claim 1 in which the quantity of solvent employed is less than the quantity of styrene subjected to the polymerization reaction.

17. A process as claimed in claim 1 in which the quantity of solvent employed is greater than the quantity of styrene subjected to the polymerization reaction.

LESLIE ERNEST WAKEFORD.
DONALD HELMSLEY HEWITT.

REFERENCES CITED

The following references are of record in the file of this patent:

UNITED STATES PATENTS

| Number | Name | Date |
|---|---|---|
| 1,910,846 | Maximoff | May 23, 1933 |
| 2,313,728 | Austin et al. | May 16, 1943 |
| 2,383,084 | Rummelsburg | Aug. 21, 1945 |
| 2,392,710 | Wakeford et al. | Jan. 8, 1946 |

FOREIGN PATENTS

| Number | Country | Date |
|---|---|---|
| 278,486 | Germany | May 24, 1913 |

OTHER REFERENCES

Synthetic Resins and Allied Plastics, R. S. Morrell (Oxford Univ. Press) 1937, page 321.